United States Patent
Sethi et al.

(10) Patent No.: US 11,728,853 B2
(45) Date of Patent: Aug. 15, 2023

(54) WIRELESS COMMUNICATION DEVICE WITH NULL STEERING CAPABILITY

(71) Applicant: NXP USA, Inc., Austin, TX (US)

(72) Inventors: Ankit Sethi, Pune (IN); Sayak Roy, Kolkata (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 82 days.

(21) Appl. No.: 17/301,937

(22) Filed: Apr. 19, 2021

(65) Prior Publication Data

US 2022/0337294 A1    Oct. 20, 2022

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01); *H04B 7/0626* (2013.01); *H04B 7/0634* (2013.01)

(58) Field of Classification Search
CPC .................................................. H04B 7/0456
USPC ......................................................... 370/252
See application file for complete search history.

(56) References Cited

U.S. PATENT DOCUMENTS

| | | | |
|---|---|---|---|
| 8,838,041 B2 | 9/2014 | Nabar et al. | |
| 9,520,646 B1 | 12/2016 | Nair et al. | |
| 9,711,863 B2 | 7/2017 | De Luis et al. | |
| 10,602,377 B2 | 3/2020 | Vannucci et al. | |
| 2012/0274514 A1* | 11/2012 | Petersson | H04B 7/10 342/373 |
| 2013/0244594 A1* | 9/2013 | Alrabadi | H04B 7/0413 455/78 |
| 2015/0318878 A1* | 11/2015 | Damodaran | H04B 7/0617 375/296 |
| 2020/0296592 A1* | 9/2020 | Höhne | H04B 7/0626 |

* cited by examiner

*Primary Examiner* — Lihong Yu

(57) ABSTRACT

A wireless communication device includes first and second links. The first and second links respectively include first and second sets of antennae having an arrangement that renders a null space of a channel matrix between the first and second links non-zero. When the first and second links operate on a first frequency band, the first link obtains first channel state information that indicates a first channel measurement of a first set of channels observed from the second link to the first link. Based on the first channel state information, the first link determines a spatial mapping matrix that facilitates null steering of a signal transmission from the first link in a direction of the second link. The first link transmits to a remote device, a wireless signal on the first frequency band based on the spatial mapping matrix.

23 Claims, 8 Drawing Sheets

WIRELESS COMMUNICATION DEVICE WITH NULL STEERING CAPABILITY

BACKGROUND

The present disclosure relates generally to wireless communication systems, and, more particularly, to a wireless communication device with null steering capability.

Wireless devices typically include multiple links (such as a Bluetooth link, a Wireless Large Area Network (WLAN) link, a Zigbee link, and/or the like) for wireless communication. Further, the wireless devices are capable of communicating simultaneously on these multiple links. When two or more links of a wireless device communicate simultaneously with other wireless devices, a radio frequency (RF) signal of one link may cause power leakage into an RF signal of another link. Such power leakage from one link to another may result in intermodulation issues, transmission spectral mask violations, and degradation of packet decoding performance and channel access assessments of the links. Various known solutions to prevent power leakage between the links include physical isolation of the links from each other using complex and expensive antenna designs. However, with the decreasing sizes of the wireless devices, achieving required physical isolation between the links is not feasible.

In light of the foregoing, there exists a need for a technical solution that solves the aforementioned problems in wireless devices having multiple communication links.

SUMMARY

In one embodiment of the present disclosure, a wireless communication device is disclosed. The wireless communication device includes first and second links. The first link includes a first set of antennae and the second link includes a second set of antennae. The first and second sets of antennae have an arrangement such that a null space of a channel matrix between the first link and the second link is non-zero. The first link is configured to obtain first channel state information that indicates a first channel measurement of a first set of channels observed from the second link to the first link, when the first link and the second link are calibrated to operate on a first frequency band. The first link is further configured to determine, based on the first channel state information, a spatial mapping matrix that facilitates null steering of a signal transmission from the first link in a direction of the second link. The first link is further configured to transmit a first wireless signal in the first frequency band to a first remote device based on the spatial mapping matrix. The first wireless signal is null steered in the direction of the second link.

In another embodiment of the present disclosure, a method of wireless communication in a wireless communication device is disclosed. The wireless communication device includes first and second links that include first and second sets of antennae, respectively. The method includes obtaining, by the first link, first channel state information that indicates a first channel measurement of a first set of channels observed from the second link to the first link, when the first link and the second link are calibrated to operate on a first frequency band. The first and second sets of antennae have an arrangement such that a null space of a channel matrix between the first link and the second link is non-zero. The method further includes determining, by the first link, based on the first channel state information, a spatial mapping matrix that facilitates null steering of a signal transmission from the first link in a direction of the second link. The method further includes transmitting, by the first link, a first wireless signal to a first remote device in the first frequency band based on the spatial mapping matrix. The first wireless signal is null steered in the direction of the second link.

In some embodiments, the arrangement of the first and second sets of antennae includes a first count of the first set of antennae being greater than a second count of the second set of antennae.

In some embodiments, the arrangement of the first and second sets of antennae includes a first count of the first set of antennae being less than or equal to a second count of the second set of antennae such that a channel from an antenna of the second set of antennae to each of the first set of antennae is same.

In some embodiments, the first link obtains the first channel state information based on at least one of an initiation of a communication between the first link and the first remote device, a change in a frequency of operation of the first link, a change in a temperature of the wireless communication device, a change in a voltage of the wireless communication device, and a change in a power of the wireless communication device.

In some embodiments, in order for the first link to obtain the first channel state information, the first link is further configured to transmit a first set of data packets to the second link when the first link and the second link operate on the first frequency band. The first link is further configured to receive the first channel state information from the second link in response to the first set of data packets.

In some embodiments, the second link is configured to receive the first set of data packets from the first link. The second link is further configured to determine the first channel state information based on the received first set of data packets and transmit the determined first channel state information to the first link.

In some embodiments, in order for the first link to obtain the first channel state information, the first link is further configured to transmit channel measurement request to the second link when the first link and the second link operate on the first frequency band. The first link is further configured to receive a second set of data packets from the second link in response to the channel measurement request. The first link is further configured to determine second channel state information that indicates a second channel measurement of a second set of channels observed from the first link to the second link. The first channel state information is obtained based on the second channel state information.

In some embodiments, the second link is configured to receive the channel measurement request from the first link and transmit the second set of data packets to the first link in response to the channel measurement request.

In some embodiments, the first link is further configured to obtain third channel state information that indicates a third channel measurement of a third set of channels observed from the first remote device to the first link. The spatial mapping matrix is further determined based on the third channel state information.

In some embodiments, when the first link communicates the first wireless signal to the first remote device, the second link is configured to operate on a second frequency band such that the second frequency band is different from the first frequency band.

In some embodiments, the second link is further configured to receive a second wireless signal in the second frequency band from at least one of the first remote device and a second remote device. The reception of the second wireless signal by the second link and the transmission of the first wireless signal by the first link occur simultaneously.

In some embodiments, the second link is further configured to transmit a third wireless signal in the second frequency band to at least one of the first remote device and a second remote device such that the third wireless signal is null steered in the direction of the first link. The transmission of the third wireless signal by the second link and the transmission of the first wireless signal by the first link occur simultaneously.

Various embodiments of the present disclosure disclose a wireless communication device. The wireless communication device includes a first link that includes a first set of antennae and a second link that includes a second set of antennae. The arrangement of the first and second sets of antennae in the wireless communication device is such that a channel matrix between the first link and the second link has a non-zero null space. The first link is configured to obtain first channel state information when the first and second links are calibrated to operate on a first frequency band. The first channel state information indicates a first channel measurement of a first set of channels observed from the second link to the first link. Based on the first channel state information, the first link is configured to determine a spatial mapping matrix that facilitates null steering of a signal transmission from the first link in a direction of the second link. Further, the first link is configured to transmit a first wireless signal in the first frequency band based on the spatial mapping matrix to a first remote device such that the transmitted first wireless signal is null steered in the direction of the second link.

Technical improvements in the wireless communication device enables the first link to transmit the first wireless signal that is null steered in the direction of the second link. The null steering of the first wireless signal in the direction of the second link prevents the power leakage from the first link to the second link without relying on physical isolation between the first and second sets of antennae.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
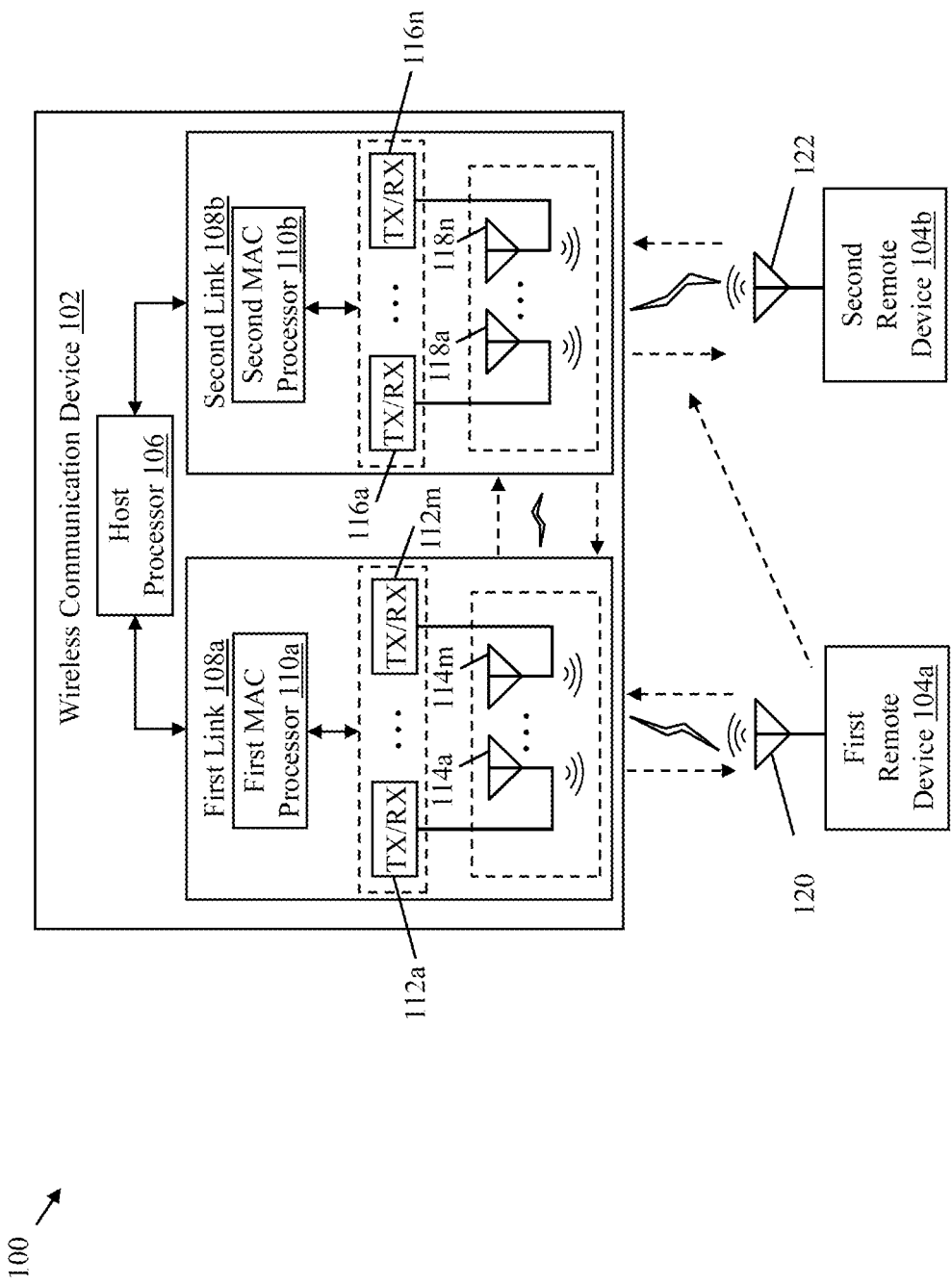
FIG. 1 illustrates a schematic block diagram of a wireless network, in accordance with an embodiment of the present disclosure.

FIG. 1 illustrates a schematic block diagram of a wireless network 100, in accordance with an embodiment of the present disclosure. The wireless network 100 includes a wireless communication device 102 and first and second remote devices 104a and 104b. The wireless network 100 may correspond to a Wireless local area network (WLAN), a multiple input multiple output (MIMO) network, a WiMAX network, a network that complies with IEEE 802.11, a cellular network, or the like. In one embodiment, the wireless communication device 102 may be co-located with the first and second remote devices 104a and 104b. In other words, the first and second remote devices 104a and 104b may be located in a vicinity of the wireless communication device 102. In another embodiment, at least one of the first and second remote devices 104a and 104b may be located at a distant location from the wireless communication device 102.

The wireless communication device 102 may correspond to a multi-link device that is capable of using separate frequency bands for simultaneous (or concurrent) communication over two or more links. In one embodiment, the wireless communication device 102 may support wireless communication in accordance with the IEEE 802.11 (e.g., 802.11be) wireless communication Standard. Examples of the wireless communication device 102 may include, but are not limited to, an access point device, a mobile phone, a laptop, a phablet, a tablet, an Internet of Thing (IoT) device, and/or the like. The wireless communication device 102 may include a host processor 106 and multiple links, for example, first and second links 108a and 108b. For the sake of brevity, the wireless communication device 102 is shown to include two links; however, in an actual implementation, the wireless communication device 102 may include more than two links without deviating from the scope of the disclosure.

The host processor 106 may be coupled to the first and second links 108a and 108b. The host processor 106 includes suitable logic, circuitry, interfaces, and/or code, executable by the circuitry, that may be configured to control one or more operations of the first and second links 108a and 108b for wireless communication. Examples of the host processor 106 may include, but are not limited to, a microprocessor, a microcontroller, an application specific integrated circuit (ASIC) processor, a reduced instruction set computer (RISC) processor, a complex instruction set computer (CISC) processor, and a field programmable gate array (FPGA). In one embodiment, the host processor 106 may include an internal memory (not shown). In another embodiment, the host processor 106 may be coupled to an external memory (not shown) on the wireless communication device 102.

The first and second links 108a and 108b may correspond to network interfaces that enable the wireless communication device 102 to perform wireless communication with the first and second remote devices 104a and 104b. Examples of the first and second links 108a and 108b may include, but are not limited to, Bluetooth links, WLAN links, Zigbee links, and/or a combination thereof. The first and second links 108a and 108b may be operable in a transmission mode and a reception mode. The transmission mode refers to a mode of operation in which the first link 108a or the second link 108b is configured to transmit RF signals to other devices, for example, the first remote device 104a or the second remote device 104b. The reception mode refers to another mode of operation in which the first link 108a or the second link 108b is configured to receive RF signals from other devices, for example, the first remote device 104a or the second remote device 104b.

In one embodiment, the wireless communication device 102 may support simultaneous transmission and reception of RF signals on the first and second links 108a and 108b. In such an embodiment, while one of the first and second links 108a and 108b operates in the transmission mode, the other link is capable of operating in any of the reception mode or the transmission mode. In another embodiment, the wireless communication device 102 may not support simultaneous transmission and reception of RF signals on the first and second links 108a and 108b. In such an embodiment, while one of the first and second links 108a and 108b operates in the transmission mode, the other link is only capable of operating in the transmission mode and not in the reception mode.

While operating in the transmission mode, the first link 108a may be configured to transmit a wireless signal in a first frequency band such that the wireless signal is null steered in the direction of the second link 108b. Similarly, when the second link 108b is configured to operate in the transmission mode, the second link 108b may be configured to transmit a wireless signal in a second frequency band different from the first frequency band such that the wireless signal is null steered in the direction of the first link 108a. Such null steering of wireless signals prevents power leakage between the first link 108a and the second link 108b.

The first link 108a may include a first medium access control (MAC) processor 110a, a first set of transceivers 112a-112m, and a first set of antennae 114a-114m. The first MAC processor 110a includes suitable logic, circuitry, interfaces, and/or code, executable by the circuitry, that may be configured to perform one or more operations for enabling null steering of wireless signals by the first link 108a. The first MAC processor 110a may be coupled to the first set of transceivers 112a-112m. The first set of transceivers 112a-112m may be coupled to the first set of antennae 114a-114m.

In some embodiments, the first MAC processor 110a and the first set of transceivers 112a-112m may be further configured to perform various operations (such as generating data units and processing data units) that conform to a WLAN communication protocol, for example, a communication protocol conforming to the IEEE 802.11 Standard or other suitable wireless communication protocols. For example, the first MAC processor 110a may be configured to execute one or more functions of a MAC layer of the WLAN communication protocol, and the first set of transceivers 112a-112m may be configured to execute one or more functions of a physical layer of the WLAN communication protocol. In one embodiment, the first MAC processor 110a may be configured to generate MAC layer data packets and provide the MAC layer data packets to the first set of transceivers 112a-112m. Based on the MAC layer data packets, the first set of transceivers 112a-112m may be configured to generate physical layer data packets for transmission by way of the first set of antennae 114a-114m. The first set of transceivers 112a-112m may be further configured to upconvert a baseband signal to an RF signal for wireless transmission by way of the first set of antennae 114a-114m. The first set of transceivers 112a-112m may be further configured to downconvert an RF signal received by the first set of antennae 114a-114m to a baseband signal.

The second link 108b may include a second MAC processor 110b, a second set of transceivers 116a-116n, and a second set of antennae 118a-118n. The second MAC processor 110b includes suitable logic, circuitry, interfaces, and/or code, executable by the circuitry, that may be configured to perform one or more operations for enabling null steering of wireless signals by the second link 108b. The second MAC processor 110b may be coupled to the second set of transceivers 116a-116n. The second set of transceivers 116a-116n may be coupled to the second set of antennae 118a-118n.

In some embodiments, the second MAC processor 110b and the second set of transceivers 116a-116n may be further configured to perform various operations (such as generating data units and processing data units) that conform to a WLAN communication protocol, for example, a communication protocol conforming to the IEEE 802.11 Standard or other suitable wireless communication protocols. For example, the second MAC processor 110b may be configured to execute one or more functions of a MAC layer of the WLAN communication protocol, and the second set of transceivers 116a-116n may be configured to execute one or more functions of a physical layer of the WLAN communication protocol. In one embodiment, the second MAC processor 110b may be configured to generate MAC layer data packets and provide the MAC layer data packets to the second set of transceivers 116a-116n. Based on the MAC layer data packets, the second set of transceivers 116a-116n may be configured to generate physical layer data packets for transmission by way of the second set of antennae 118a-118n. The second set of transceivers 116a-116n may be further configured to upconvert a baseband signal to an RF signal for wireless transmission by way of the second set of antennae 118a-118n. The second set of transceivers 116a-116n may be further configured to downconvert an RF signal received by the second set of antennae 118a-118n to a baseband signal.

Examples of the first and second MAC processors 110a and 110b may include, but are not limited to, a microprocessor, a microcontroller, an ASIC processor, a RISC processor, a CISC processor, and an FPGA.

For achieving null steering between the first link 108a and the second link 108b, the first set of antennae 114a-114m and the second set of antennae 118a-118n have an arrangement that renders a null space of a channel matrix between the second link 108b and the first link 108a non-zero. In an exemplary scenario, the first link 108a may be operating in the transmission mode and implementing Orthogonal Frequency-Division Multiplexing (OFDM) transmission with 'N' frequency tones. Further, the second link 108b may be operating in the reception mode or the transmission mode. In such a scenario, $H_k$ denotes the channel matrix between the second link 108b to the first link 108a for an OFDM tone 'k' and $h_{ij}$ denotes an $(i,j)^{th}$ element of the channel matrix ($H_k$), where $h_{ij}$ represents a channel between an $i^{th}$ antenna of the second link 108b to a $j^{th}$ antenna of the first link 108a. It will be apparent to a person of ordinary skill in the art that channel matrices similar to the channel matrix $H_k$ exist for other OFDM tones without deviating from the scope of disclosure.

In one embodiment, the arrangement of the first set of antennae 114a-114m and the second set of antennae 118a-118n may include a first count of the first set of antennae 114a-114m being greater than a second count of the second set of antennae 118a-118n. For example, the first set of antennae 114a-114m may include four antennae (i.e., the first count) and the second set of antennae 118a-118n may include two antennae (i.e., the second count). Such arrangement of the first set of antennae 114a-114m and the second set of antennae 118a-118n results in a non-zero null space of the channel matrix ($H_k$).

In another embodiment, the arrangement of the first set of antennae 114a-114m and the second set of antennae 118a-118n may include the first count of the first set of antennae 114a-114m being less than or equal to the second count of the second set of antennae 118a-118n, and a channel from an antenna of the second set of antennae 118a-118n to each of the first set of antennae 114a-114m is the same. For example, the first set of antennae 114a-114m may include two antennae (i.e., the first count) and the second set of antennae 118a-118n may include two antennae (i.e., the second count). In such an example, the null space of the channel matrix ($H_k$) is non-zero, when each antenna of the second set of antennae 118a-118n is symmetrically located and spatially equidistant from each antenna of the first set of antennae 114a-114m, and thus, sees the same channel.

In another embodiment, the first count of the first set of antennae 114a-114m may be less than or equal to the second count of the second set of antennae 118a-118n and a channel from an antenna of the second set of antennae 118a-118n to each of the first set of antennae 114a-114m may not be the same. In such an embodiment, the first and second MAC processors 110a and 110b may be configured to selectively activate subsets of the first set of antennae 114a-114m and the second set of antennae 118a-118n to achieve the non-zero null space of the channel matrix ($H_k$). In one example, the first and second MAC processors 110a and 110b may selectively activate subsets of the first set of antennae 114a-114m and the second set of antennae 118a-118n to ensure that a count of the activated antennae in the first set of antennae 114a-114m is greater than a count of activated antennae in the second set of antennae 118a-118n. In another example, the first and second MAC processors 110a and 110b may selectively activate subsets of the first set of antennae 114a-114m and the second set of antennae 118a-118n such that each activated antenna of the second set of antennae 118a-118n is symmetrically located and spatially equidistant from each activated antenna of the first set of antennae 114a-114m, and thus, sees the same channel. Remaining antennae of the first set of antennae 114a-114m and the second set of antennae 118a-118n that are not activated may not be operational for that specific wireless communication session.

The wireless communication device 102 may be coupled to the first and second remote devices 104a and 104b by way of the first set of antennae 114a-114m and the second set of antennae 118a-118n for wireless communication. In one example, the first and second remote devices 104a and 104b may correspond to access point devices, mobile phones, laptops, phablets, tablets, Internet of Thing (IoT) devices, and/or the like. In another example, the first and second remote devices 104a and 104b may be functionally and structurally similar to the wireless communication device 102. The first remote device 104a may include one or more antennae (e.g., a third antenna 120) using which the first remote device 104a communicates wirelessly with the wireless communication device 102. Likewise, the second remote device 104b may include one or more antennae (e.g., a fourth antenna 122) using which the second remote device 104b communicates wirelessly with the wireless communication device 102.

Various operations executed by the first link 108a and the second link 108b to implement null steering therebetween for wireless communication are described in detail in conjunction with FIGS. 2-5.

Figure 2:
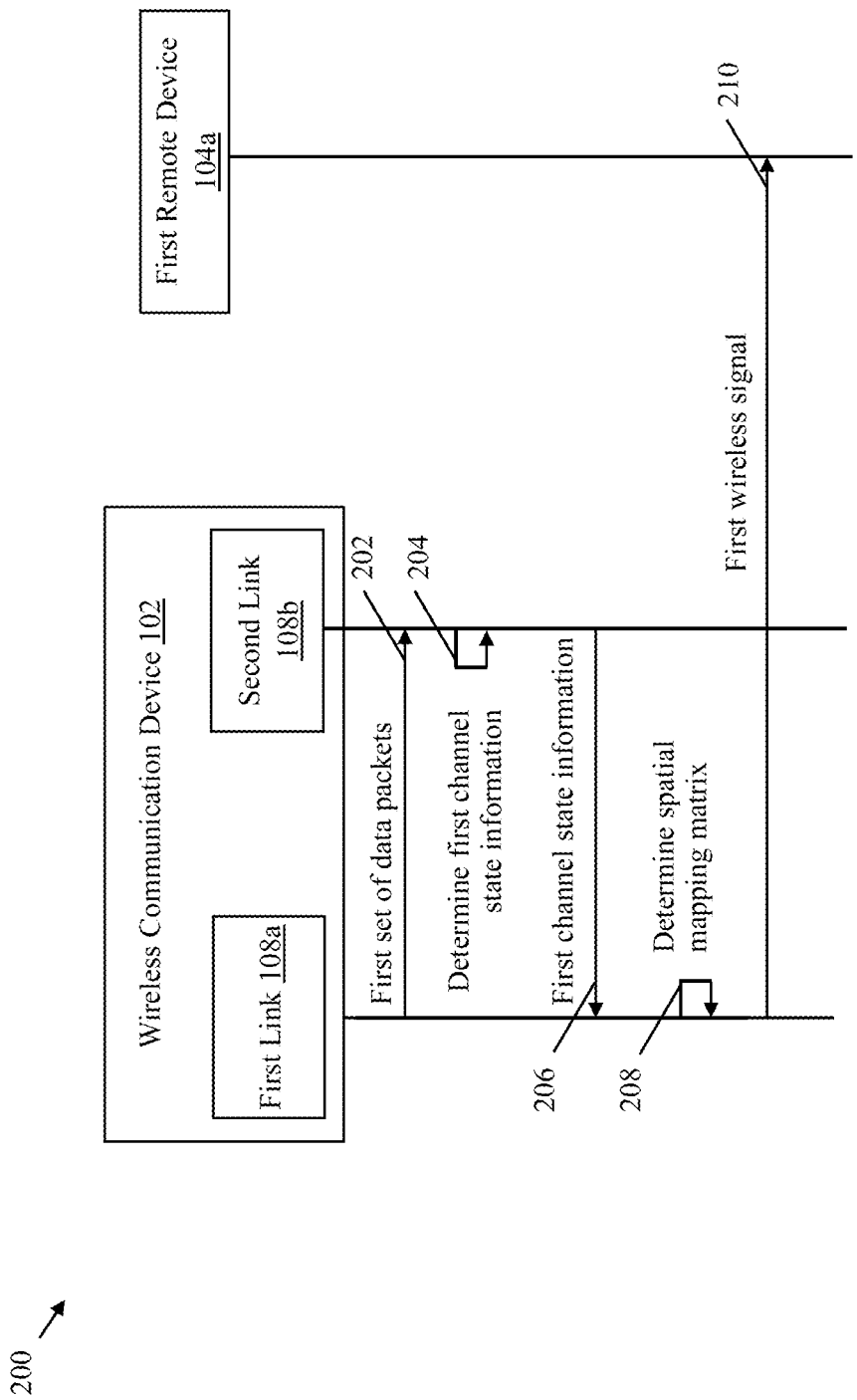
FIG. 2 is a sequence diagram that illustrates various operations executed by first and second links of a wireless communication device of FIG. 1 for wireless communication, in accordance with an embodiment of the present disclosure.

FIG. 2 is a sequence diagram 200 that illustrates various operations executed by the first and second links 108a and 108b for wireless communication, in accordance with an embodiment of the present disclosure.

In an exemplary embodiment, the first link 108a may be required to transmit an unsteered first wireless signal to the first remote device 104a and the second link 108b may be required to receive a second wireless signal from the second remote device 104b, concurrently. In such a scenario, prior to the initiation of the wireless communication, the first link 108a is configured to determine a first spatial mapping matrix $Q_k$ that facilitates null steering of signal transmission from the first link 108a in a direction of the second link 108b, to ensure that no power is leaked from the first wireless signal into the second wireless signal.

The host processor 106 may be configured to initiate a calibration process to enable the first link 108a to determine the first spatial mapping matrix $Q_k$. During the calibration process, the host processor 106 may be configured to transmit a first calibration instruction to the first link 108a and a second calibration instruction to the second link 108b. The first calibration instruction is to calibrate the first link 108a to operate in the transmission mode on the first frequency band (e.g., 5 GHz). The second calibration instruction is to calibrate the second link 108b to operate in the reception mode on the first frequency band (e.g., 5 GHz), where the first frequency band corresponds to an operating frequency band of the first link 108a. Based on the first calibration instruction, the first link 108a is calibrated to operate in the transmission mode on the first frequency band. For example, the first MAC processor 110a may tune the first set of transceivers 112a-112m and the first set of antennae 114a-114m to operate in the transmission mode on the first frequency band. Further, based on the second calibration instruction, the second link 108b is calibrated to operate in the reception mode on the first frequency band. For example, the second MAC processor 110b may tune the second set of transceivers 116a-116n and the second set of antennae 118a-118n to operate in the reception mode on the first frequency band. The calibration (or tuning) of the first and second links 108a and 108b to operate on the first frequency band ensures that any signal transmission from the first link 108a lies in-band for the second link 108b to receive, thereby removing out of band noise and improving a signal-to-noise ratio (SNR) for the second link 108b.

When the first and second links 108a and 108b are calibrated to operate on the first frequency band, the first link 108a may be configured to obtain first channel state information $V_k$ that indicates a first channel measurement of a first set of channels observed from the second link 108b to the first link 108a. For obtaining the first channel state information $V_k$, the first link 108a may be configured to transmit, on the first frequency band, a first set of data packets to the second link 108b (as shown by arrow 202). In one embodiment, the first set of data packets may be generated by the first MAC processor 110a. In one example, the first set of data packets may correspond to a set of null data packets that does not include any payload. In another example, the first set of data packets may correspond to a set of network data packets that include control information and payload. The first link 108a may transmit the first set of data packets via the first set of antennae 114a-114m.

As the second link 108b is also calibrated to operate on the first frequency band, the second link 108b receives the first set of data packets via the second set of antennae 118a-118n. The second link 108b may be configured to determine the first channel state information $V_k$ based on the received first set of data packets (as shown by arrow 204). The first set of data packets may include one or more fields that enable the second link 108b to accurately determine the first channel state information $V_k$. The first channel state information $V_k$ is indicative of the first channel measurement of the first set of channels observed from the second link 108b to the first link 108a. For example, the first channel measurement of the first set of channels may indicate amplitudes and phases of each channel observed from the second link 108b to the first link 108a. The first channel measurement of the first set of channels may further indicate one or more eigen vectors for a null space of the second link 108b. In other words, the first channel state information $V_k$ indicates RF channel characteristics of the first set of channels. The first set of channels observed from the second link 108b to the first link 108a (for a frequency tone 'k' in OFDM transmission) may be represented by a matrix $H_{L2,k}$ as shown in equation (1) below:

$$H_{L2,k} = H_{RxL2,k} * H_k * H_{TxL1,k} \tag{1}$$

where,
$H_{RxL2,k}$ represents a matrix of a first set of intermediate channels observed from the second set of antennae 118a-118n to the second set of transceivers 116a-116n; $H_k$ represents the channel matrix a set of channels observed from the second set of antennae 118a-118n to the first set of antennae 114a-114m; and $H_{TxL1,k}$ represents a matrix of a second set of intermediate channels observed from the first set of transceivers 112a-112m to the first set of antennae 114a-114m.

In equation (1), the matrices $H_{RxL2,k}$ and $H_{TxL1,k}$ may be unitary matrices. Thus, the matrix $H_{L2,k}$ representing the first set of channels observed from the second link 108b to the first link 108a may be the same as the channel matrix $H_k$. In one embodiment, the second MAC processor 110b may determine the first channel state information $V_k$, using the first set of data packets, for the first set of channels represented by the matrix $H_{L2,k}$. It will be apparent to a person of ordinary skill in the art that the first channel state information $V_k$ may be obtained for all "N" OFDM tones without deviating from the scope of the disclosure.

The second link 108b may be further configured to transmit the determined first channel state information $V_k$ to the first link 108a (as shown by arrow 206). In one embodiment, the second link 108b may be configured to transmit the determined first channel state information $V_k$ to the first link 108a wirelessly via the second set of antennae 118a-118n. In another embodiment, the second link 108b may be configured to transmit the determined first channel state information $V_k$ to the first link 108a via one or more interconnects (not shown) or communication busses that couple the first and second links 108a and 108b. In another embodiment, the second link 108b may be configured to transmit the determined first channel state information $V_k$ to the first link 108a via the host processor 106.

The first link 108a may be configured to receive the first channel state information $V_k$ from the second link 108b in response to the first set of data packets. The first link 108a may be further configured to determine the first spatial mapping matrix $Q_k$ based on the first channel state information $V_k$ (as shown by arrow 208). In an example, the first link 108a may determine the first spatial mapping matrix $Q_k$ based on below-mentioned equation (2):

$$Q_k = I - V_k * V_k^H \tag{2}$$

where,
I represents a unitary matrix; and
$V_k^H$ represents a conjugate transpose of the first channel state information $V_k$ matrix.

The first spatial mapping matrix $Q_k$ may facilitate null steering of a signal transmission from the first link 108a in the direction of the second link 108b. The first link 108a may be configured to transmit the first wireless signal in the first frequency band to the first remote device 104a based on the determined first spatial mapping matrix $Q_k$ (as shown by arrow 210). The first wireless signal is unsteered towards the first remote device 104a. While the first link 108a is communicating the first wireless signal to the first remote device 104a, the second link 108b may be calibrated to operate on the second frequency band that is different from the first frequency band to receive the second wireless signal from the second remote device 104b. In other words, the reception of the second wireless signal by the second link 108b and the transmission of the first wireless signal by the first link 108a occur simultaneously. Since the transmission of the first wireless signal by the first link 108a is null steered in the direction of the second link 108b, a power leakage from the transmission of the first wireless signal into the second wireless signal received by the second link 108b is prevented.

In an embodiment, the host processor 106 may initiate the calibration process and the first link 108a may obtain the first channel state information $V_k$ based on at least one of an initiation of a communication between the first link 108a and the first remote device 104a, a change in a frequency of operation of the first link 108a, a change in a temperature of the wireless communication device 102, a change in a voltage of the wireless communication device 102, and a change in a power of the wireless communication device 102. For example, when the host processor 106 detects that a frequency of operation of the first link 108a has changed, the host processor 106 may initiate the calibration process, where both the first and second links 108a and 108b are calibrated to operate on the changed frequency band, and the first link 108a obtains the first channel state information $V_k$ from the second link 108b for spatial mapping matrix determination. Such re-determination of the first spatial mapping matrix $Q_k$ ensures that no power leakage happens upon initiation of a new communication session between the first link 108a and any remote device, a change in the frequency of operation of the first link 108a, a change in the temperature of the wireless communication device 102, a change in the voltage of the wireless communication device 102, and a change in the power of the wireless communication device 102. In one embodiment, the host processor 106 may be configured to detect the initiation of a communication between the first link 108a and any remote device, a change in the frequency of operation of the first link 108a, and a temperature, a voltage, and/or a power change in the wireless communication device 102.

It will be apparent to a person skilled in the art that the operations performed by the first link 108a may be performed by the second link 108b in order to communicate with the first remote device 104a or the second remote device 104b with significantly reduced power leakage in the operations of the first link 108a. For example, when the second link 108b is configured to operate in the transmission mode to wirelessly communicate with any of the first or second remote device 104a or 104b, the second link 108b may transmit a third wireless signal such that the third wireless signal is null steered in the direction of the first link 108a. The second link 108b may achieve null steering by way of the calibration process and the determination of a spatial mapping matrix as described in the foregoing description for the first link 108a.

It will be apparent to a person skilled in the art that the scope of the present disclosure is not limited to null steer a wireless transmission in the direction of a single link. In another embodiment, the wireless communication device 102 may include more than two links (e.g., a third link, a fourth link, or the like). In such an embodiment, the first wireless signal from the first link 108a may be null steered in the direction of two or more links available on the wireless communication device 102. To null steer the first wireless signal in the direction of the two or more links, the first link 108a may determine another spatial mapping matrix by obtaining channel state information from the two or more links.

Figure 3:
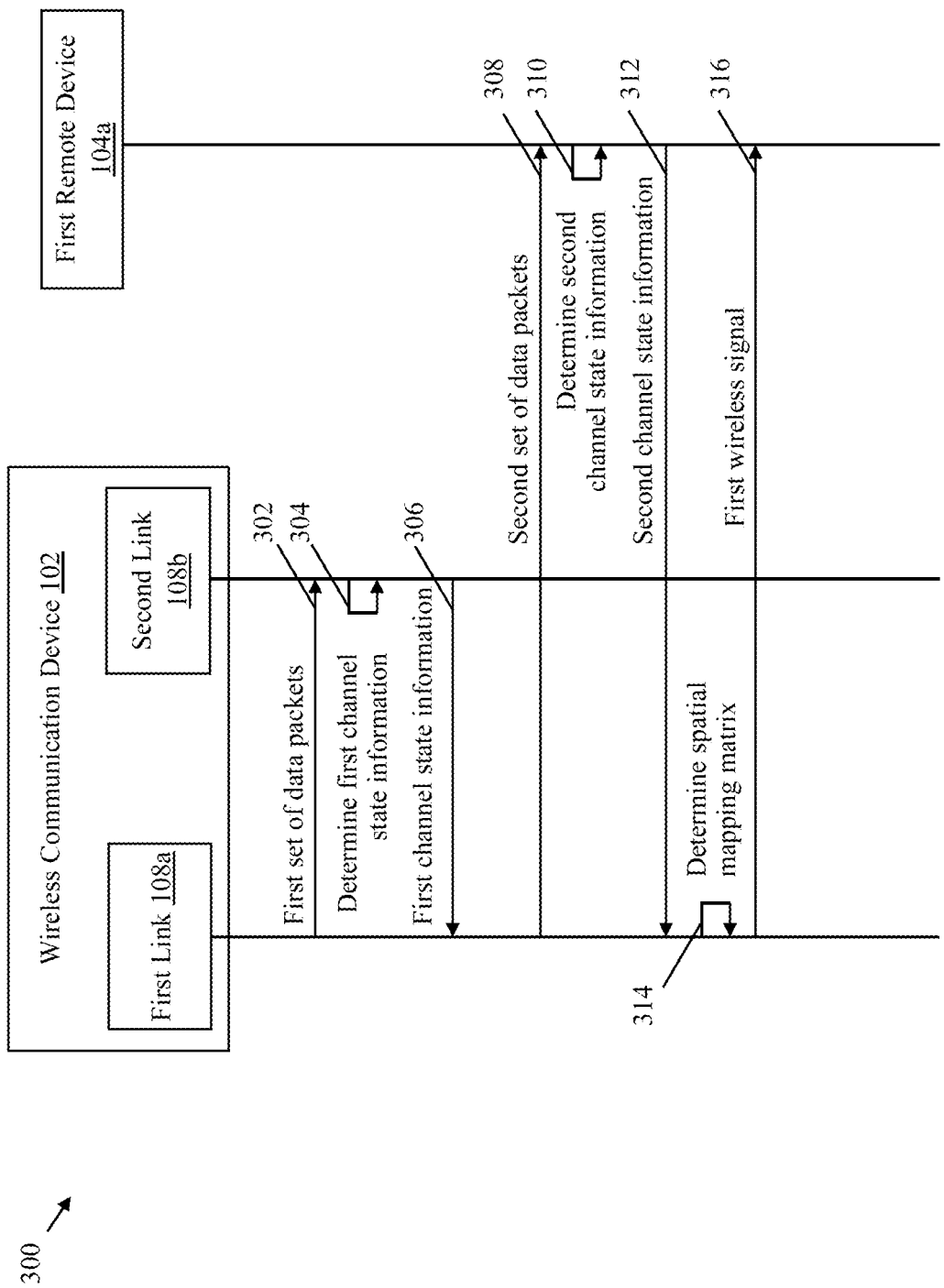
FIG. 3 is a sequence diagram that illustrates various operations executed by the first and second links of the wireless communication device of FIG. 1 for wireless communication, in accordance with another embodiment of the present disclosure.

FIG. 3 is a sequence diagram 300 that illustrates various operations executed by the first and second links 108a and 108b for wireless communication, in accordance with another embodiment of the present disclosure.

In an exemplary embodiment, the first link 108a may be required to transmit a steered (e.g., a beamformed) first wireless signal to the first remote device 104a and the second link 108b may be required to receive the second wireless signal from the second remote device 104b, concurrently. In such a scenario, prior to the initiation of the wireless communication, the first link 108a is configured to determine a second spatial mapping matrix $Q_k$ that facilitates null steering of signal transmission from the first link 108a in a direction of the second link 108b, to ensure that no power is leaked from the first wireless signal into the second wireless signal.

The host processor 106 may be configured to initiate the calibration process to enable the first link 108a to determine the second spatial mapping matrix $Q_k$. During the calibration process, the host processor 106 may be configured to transmit the first calibration instruction to the first link 108a and the second calibration instruction to the second link 108b.

Based on the first calibration instruction, the first link 108a is calibrated to operate in the transmission mode on the first frequency band. For example, the first MAC processor 110a may tune the first set of transceivers 112a-112m and the first set of antennae 114a-114m to operate in the transmission mode on the first frequency band. Further, based on the second calibration instruction, the second link 108b is calibrated to operate in the reception mode on the first frequency band. For example, the second MAC processor 110b may tune the second set of transceivers 116a-116n and the second set of antennae 118a-118n to operate in the reception mode on the first frequency band.

When the first and second links 108a and 108b are calibrated to operate on the first frequency band, the first link 108a may be configured to obtain the first channel state information $V_k$ from the second link 108b. For obtaining the first channel state information $V_k$, the first link 108a may be configured to transmit, on the first frequency band, the first set of data packets to the second link 108b (as shown by arrow 302). In one embodiment, the first set of data packets may be generated by the first MAC processor 110a. The first link 108a may transmit the first set of data packets via the first set of antennae 114a-114m.

As the second link 108b is also calibrated to operate on the first frequency band, the second link 108b receives the first set of data packets via the second set of antennae 118a-118n. The second link 108b may be configured to determine the first channel state information $V_k$ based on the received first set of data packets (as shown by arrow 304). The determination of the first channel state information $V_k$ is described in the foregoing description of FIG. 2.

In one embodiment, the first channel state information $V_k$ may be determined by the second MAC processor 110b using the first set of data packets. The second link 108b may be further configured to transmit the determined first channel state information $V_k$ to the first link 108a (as shown by arrow 306). In one embodiment, a matrix representing the determined first channel state information $V_k$ may have dimensions as NTx*NRx, where NTx represents the first count of the first set of antennae 114a-114m and NRx represents the second count of the second set of antennae 118a-118n.

The first link 108a may be configured to receive the first channel state information $V_k$ from the second link 108b in response to the first set of data packets. The first link 108a may be further configured to transmit a second set of data packets to the first remote device 104a via the first set of antennae 114a-114m (as shown by arrow 308). In one embodiment, the first MAC processor 110a may be configured to generate and provide the second set of data packets to the first set of transceivers 112a-112m. In one example, the second set of data packets is a set of null data packets.

The first remote device 104a may be configured to receive the second set of data packets, and determine second channel state information $V_{STA,k}$ based on the received second set of data packets (as shown by arrow 310). The second set of data packets may include one or more fields that enable the first remote device 104a to accurately determine the second channel state information $V_{STA,k}$. The second channel state information $V_{STA,k}$ may be indicative of a second channel measurement of a second set of channels observed from the first remote device 104a to the first link 108a. The channel measurements of each of the second set of channels may indicate at least amplitudes and phases of each channel between the first link 108a and the first remote device 104a. The first remote device 104a may determine the second channel state information $V_{STA,k}$ as determined by the second link 108b using the first set of data packets. In one embodiment, a matrix representing the determined second channel state information $V_{STA,k}$ may have dimensions as NTx*Nss, where NTx represents the first count of the first set of antennae 114a-114m and Nss represents a count of antennae (e.g., the third antenna 120) in the first remote device 104a.

The first remote device 104a may be configured to transmit the determined second channel state information $V_{STA,k}$ to the first link 108a, via the third antenna 120 (as shown by arrow 312). The first link 108a may be configured to receive the second channel state information $V_{STA,k}$ from the first remote device 104a in response to the second set of data packets. The first link 108a may be further configured to determine the second spatial mapping matrix $Q_k$ based on the first channel state information $V_k$ and the second channel state information $V_{STA,k}$ (as shown by arrow 314). In one example, the second spatial mapping matrix $Q_k$ may be determined based on below-mentioned equation (3):

$$Q_k = \text{First } N_{SS} \text{ columns of } \begin{bmatrix} V_{STA,k}^H \\ V_k^H \end{bmatrix}^\dagger \quad (3)$$

where,
$V_{STA,k}^H$ represents a conjugate transpose of the second channel state information $V_{STA,k}$ matrix;
$V_k^H$ represents a conjugate transpose of the first channel state information $V_k$ matrix;

$$\begin{bmatrix} V_{STA,k}^H \\ V_k^H \end{bmatrix}^\dagger$$

represents a matrix obtained by applying a pseudo inverse operation on $$\begin{bmatrix} V_{STA,k}^H \\ V_k^H \end{bmatrix}$$

matrix; and
$N_{SS}$ represents a number of columns in the second channel state information $V_{STA,k}$ matrix.

The second spatial mapping matrix $Q_k$ may facilitate null steering of a signal transmission from the first link 108a in the direction of the second link 108b and steering of the signal transmission from the first link 108a in the direction of the first remote device 104a. The first link 108a may be configured to transmit the first wireless signal steered towards the first remote device 104a in the first frequency band based on the determined second spatial mapping matrix $Q_k$ (as shown by arrow 316). In this case, the transmission of the first wireless signal by the first link 108a is null steered in the direction of the second link 108b and steered towards the first remote device 104a. While the first link 108a is communicating the first wireless signal to the first remote device 104a, the second link 108b may be calibrated by the host processor 106 to operate on the second frequency band (that is different from the first frequency band) to receive the second wireless signal from the second remote device 104b. In other words, the reception of the second wireless signal by the second link 108b and the transmission of the first wireless signal by the first link 108a occur simultaneously. Since the transmission of the first wireless signal by the first link 108a is null steered in the direction of the second link 108b, a power leakage from the transmission of the first wireless signal by the first link 108a into the second wireless signal received by the second link 108b is prevented.

It will be apparent to a person skilled in the art that the operations performed by the first link 108a may be performed by the second link 108b in order to communicate with the first remote device 104a or the second remote device 104b with significantly reduced power leakage in the operations of the first link 108a. For example, when the second link 108b is configured to operate in the transmission mode to wirelessly communicate with any of the first or second remote device 104a or 104b, the second link 108b may transmit the third wireless signal such that the third wireless signal is null steered in the direction of the first link 108a. The second link 108b may achieve null steering by way of the calibration process and the determination of a spatial mapping matrix as described in the foregoing for the first link 108a.

In an embodiment, the host processor 106 may initiate the calibration process and the first link 108a may obtain the first channel state information $V_k$ based on at least one of an initiation of a communication between the first link 108a and the first remote device 104a, a change in a frequency of operation of the first link 108a, a change in a temperature of the wireless communication device 102, a change in a voltage of the wireless communication device 102, and a change in a power of the wireless communication device 102 as described in the foregoing description of FIG. 2.

Figure 4:
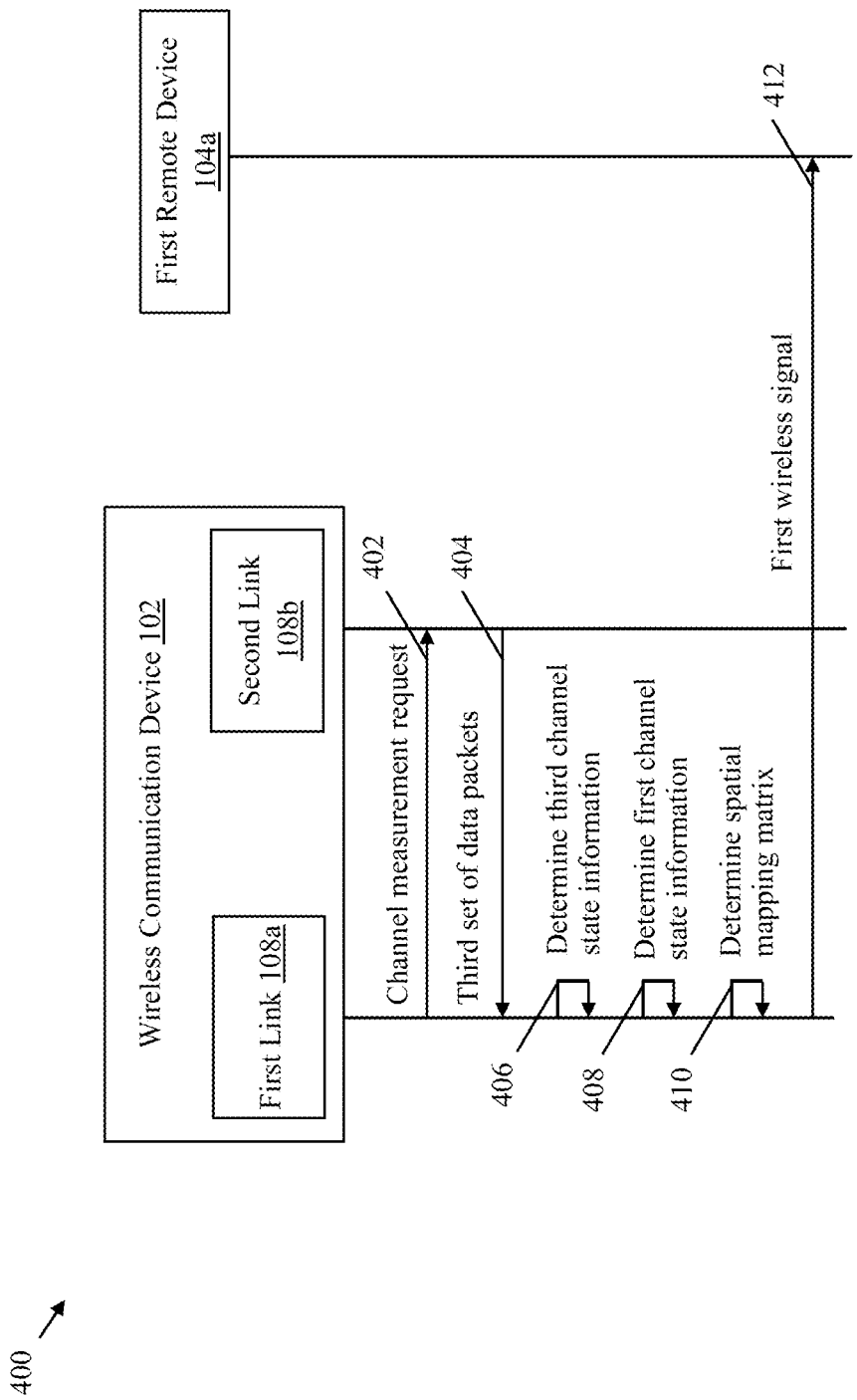
FIG. 4 is a sequence diagram that illustrates various operations executed by the first and second links of the wireless communication device of FIG. 1 for wireless communication, in accordance with another embodiment of the present disclosure.

FIG. 4 is a sequence diagram 400 that illustrates various operations executed by the first and second links 108a and 108b for wireless communication, in accordance with another embodiment of the present disclosure.

In an exemplary embodiment, the first link 108a may be required to transmit an unsteered first wireless signal to the first remote device 104a and the second link 108b may be required to receive a second wireless signal from the second remote device 104b, concurrently. In such a scenario, prior to the initiation of the wireless communication, the first link 108a is configured to determine the first spatial mapping matrix $Q_k$ that facilitates null steering of signal transmission from the first link 108a in the direction of the second link 108b, to ensure that no power is leaked from the first wireless signal into the second wireless signal.

The host processor 106 may be configured to initiate the calibration process to enable the first link 108a to determine the first spatial mapping matrix $Q_k$. During the calibration process, the host processor 106 may be configured to transmit the first calibration instruction to the first link 108a and the second calibration instruction to the second link 108b. Based on the first calibration instruction, the first link 108a is calibrated to operate in the transmission mode on the first frequency band. For example, the first MAC processor 110a may tune the first set of transceivers 112a-112m and the first set of antennae 114a-114m to operate in the transmission mode on the first frequency band. Further, based on the second calibration instruction, the second link 108b is calibrated to operate in the reception mode on the first frequency band. For example, the second MAC processor 110b may tune the second set of transceivers 116a-116n and the second set of antennae 118a-118n to operate in the reception mode on the first frequency band.

When the first and second links 108a and 108b are calibrated to operate on the first frequency band, the first link 108a may be configured to obtain the first channel state information $V_k$ that indicates the first channel measurement of the first set of channels observed from the second link 108*b* to the first link 108*a*. For obtaining the first channel state information $V_k$, the first link 108*a* may be configured to transmit a channel measurement request to the second link 108*b* (as shown by arrow 402). In one embodiment, the first link 108*a* may transmit the channel measurement request to the second link 108*b* wirelessly via the first set of antennae 114*a*-114*m*. In another embodiment, the first link 108*a* may transmit the channel measurement request to the second link 108*b* via one or more interconnects (not shown) or communication busses that couple the first and second links 108*a* and 108*b*. In another embodiment, the first link 108*a* may transmit the channel measurement request to the second link 108*b* via the host processor 106.

The second link 108*b* may be configured to receive the channel measurement request and transmit a third set of data packets to the first link 108*a* in response to the channel measurement request (as shown by arrow 404). The third set of data packets may be generated and provided by the second MAC processor 110*b* to the second set of transceivers 116*a*-116*n* in response to the channel measurement request. In one example, the third set of data packets may correspond to a set of null data packets that does not include any payload. In another example, the third set of data packets may correspond to a set of network data packets that include control information and payload. The second link 108*b* may transmit the third set of data packets to the first link 108*a* via the second set of antennae 118*a*-118*n*.

The first link 108*a* may be configured to receive the third set of data packets and determine third channel state information based on the received third set of data packets (as shown by arrow 406). The third set of data packets may include one or more fields that enable the first link 108*a* to accurately determine the third channel state information. The third channel state information may be indicative of third channel measurement of a third set of channels observed from the first link 108*a* to the second link 108*b*. For example, the third channel measurement of the third set of channels may indicate amplitudes and phases of each channel observed from the first link 108*a* to the second link 108*b*. The first link 108*a* further determines the first channel state information $V_k$ based on the determined third channel state information (as shown by arrow 408). In an embodiment, the first link 108*a* may determine the first channel state information $V_k$ by transposing a matrix representing the third channel state information.

The first link 108*a* may be further configured to determine the first spatial mapping matrix $Q_k$ based on the first channel state information $V_k$ (as shown by arrow 410). In an example, the first link 108*a* may determine the first spatial mapping matrix $Q_k$ based on equation (2) as described in the foregoing description of FIG. 2.

The first link 108*a* may be configured to transmit the first wireless signal in the first frequency band to the first remote device 104*a* based on the determined first spatial mapping matrix $Q_k$ (as shown by arrow 412). The first wireless signal is unsteered towards the first remote device 104*a*. Further, the second link 108*b* may be calibrated to operate on the second frequency band by the host processor 106 to receive the second wireless signal from the second remote device 104*b*. In other words, the reception of the second wireless signal by the second link 108*b* and the transmission of the first wireless signal by the first link 108*a* occur simultaneously. The transmission of the first wireless signal by the first link 108*a* is null steered in the direction of the second link 108*b*. As a result, a power leakage from the transmission of the first wireless signal by the first link 108*a* into the second wireless signal received by the second link 108*b* is prevented.

In an embodiment, the host processor 106 may initiate the calibration process and the first link 108*a* may obtain the first channel state information $V_k$ based on at least one of an initiation of a communication between the first link 108*a* and the first remote device 104*a*, a change in a frequency of operation of the first link 108*a*, a change in a temperature of the wireless communication device 102, a change in a voltage of the wireless communication device 102, and a change in a power of the wireless communication device 102.

It will be apparent to a person skilled in the art that the operations performed by the first link 108*a* may be performed by the second link 108*b* in order to communicate with the first remote device 104*a* or the second remote device 104*b* with significantly reduced power leakage in the operations of the first link 108*a*. For example, when the second link 108*b* is configured to operate in the transmission mode to wirelessly communicate with any of the first or second remote device 104*a* or 104*b*, the second link 108*b* may transmit the third wireless signal such that the third wireless signal is null steered in the direction of the first link 108*a*. The second link 108*b* may achieve null steering by way of the calibration process and the determination of a spatial mapping matrix as described in the foregoing for the first link 108*a*.

Figure 5:
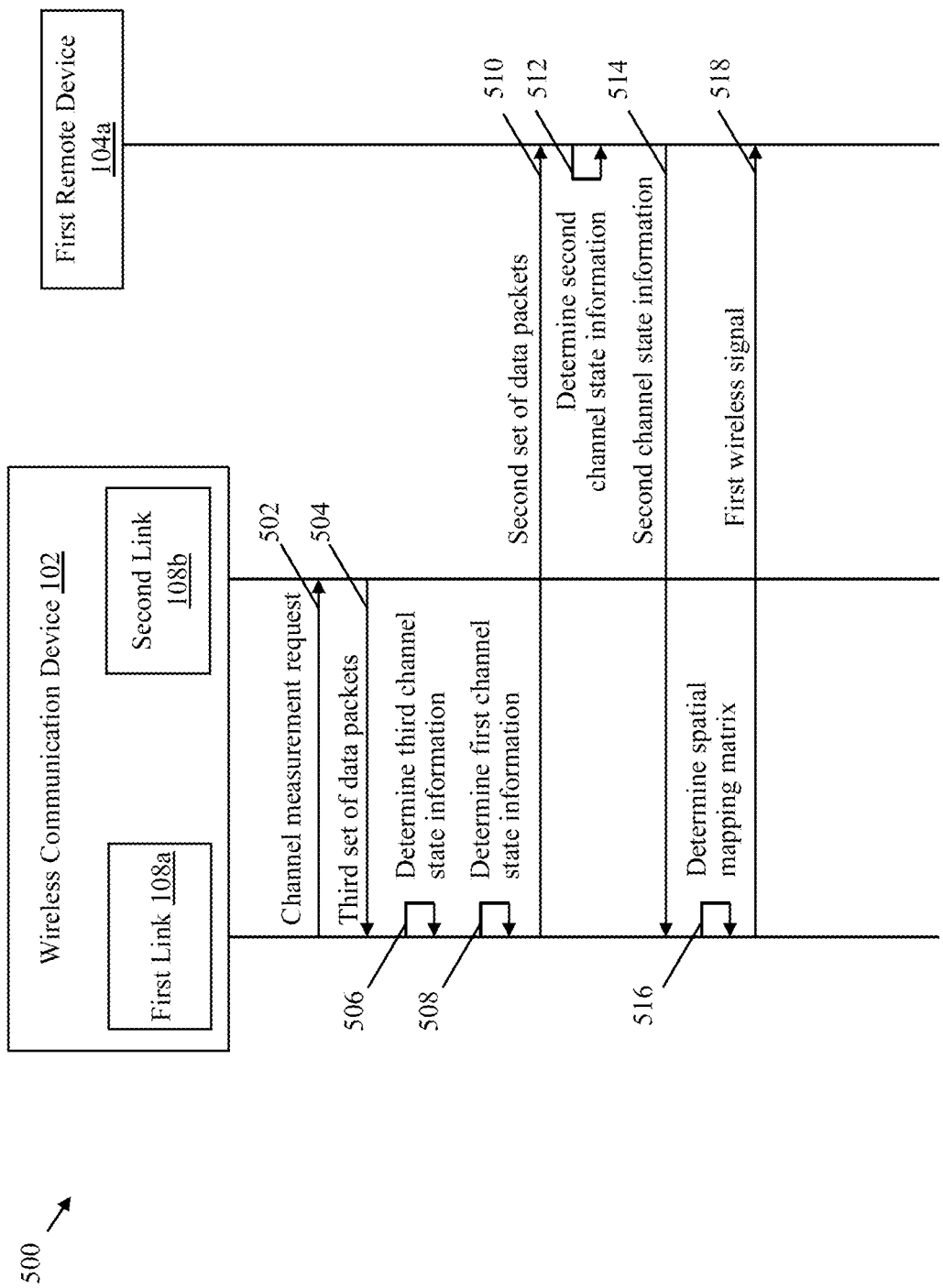
FIG. 5 is a sequence diagram that illustrates various operations executed by the first and second links of the wireless communication device of FIG. 1 for wireless communication, in accordance with another embodiment of the present disclosure.

FIG. 5 is a sequence diagram 500 that illustrates various operations executed by the first and second links 108*a* and 108*b* for wireless communication, in accordance with another embodiment of the present disclosure.

In an exemplary embodiment, the first link 108*a* may be required to transmit a steered first wireless signal to the first remote device 104*a* and the second link 108*b* may be required to receive a second wireless signal from the second remote device 104*b*, concurrently. In such a scenario, prior to the initiation of the wireless communication, the first link 108*a* is configured to determine the second spatial mapping matrix $Q_k$ that facilitates null steering of signal transmission from the first link 108*a* in the direction of the second link 108*b*, to ensure that no power is leaked from the first wireless signal into the second wireless signal.

The host processor 106 may be configured to initiate the calibration process to enable the first link 108*a* to determine the second spatial mapping matrix $Q_k$. During the calibration process, the host processor 106 may be configured to transmit the first calibration instruction to the first link 108*a* and the second calibration instruction to the second link 108*b*. Based on the first calibration instruction, the first link 108*a* is calibrated to operate in the transmission mode on the first frequency band. For example, the first MAC processor 110*a* may tune the first set of transceivers 112*a*-112*m* and the first set of antennae 114*a*-114*m* to operate in the transmission mode on the first frequency band. Further, based on the second calibration instruction, the second link 108*b* is calibrated to operate in the reception mode on the first frequency band. For example, the second MAC processor 110*b* may tune the second set of transceivers 116*a*-116*n* and the second set of antennae 118*a*-118*n* to operate in the reception mode on the first frequency band.

When the first and second links 108*a* and 108*b* are calibrated to operate on the first frequency band, the first link 108*a* may be configured to obtain the first channel state information $V_k$ that indicates the first channel measurement of the first set of channels observed from the second link 108*b* to the first link 108*a*. For obtaining the first channel state information $V_k$, the first link 108a may be configured to transmit a channel measurement request to the second link 108b (as shown by arrow 502). In one embodiment, the first link 108a may transmit the channel measurement request to the second link 108b wirelessly via the first set of antennae 114a-114m. In another embodiment, the first link 108a may transmit the channel measurement request to the second link 108b via one or more interconnects (not shown) or communication busses that couple the first and second links 108a and 108b. In another embodiment, the first link 108a may transmit the channel measurement request to the second link 108b via the host processor 106.

The second link 108b may be configured to receive the channel measurement request and transmit the third set of data packets to the first link 108a in response to the channel measurement request (as shown by arrow 504). The third set of data packets may be generated and provided by the second MAC processor 110b to the second set of transceivers 116a-116n in response to the channel measurement request. The second link 108b may transmit the third set of data packets to the first link 108a via the second set of antennae 118a-118n.

The first link 108a may be configured to receive the third set of data packets and determine the third channel state information based on the received third set of data packets (as shown by arrow 506). The third channel state information may be indicative of the third channel measurement of the third set of channels observed from the first link 108a to the second link 108b. The first link 108a may be further configured to determine the first channel state information $V_k$ based on the determined third channel state information (as shown by arrow 508). In an embodiment, the first link 108a may determine the first channel state information $V_k$ by transposing a matrix representing the third channel state information.

The first link 108a may be further configured to transmit the second set of data packets to the first remote device 104a via the first set of antennae 114a-114m (as shown by arrow 510). In one embodiment, the first MAC processor 110a may be configured to generate and provide the second set of data packets to the first set of transceivers 112a-112m. The first remote device 104a may be configured to receive the second set of data packets, and determine the second channel state information $V_{STA,k}$ based on the received second set of data packets (as shown by arrow 512). The second channel state information $V_{STA,k}$ may be indicative of the second channel measurement of the second set of channels from the first remote device 104a to the first link 108a. The channel measurements of each of the second set of channels may indicate at least amplitudes and phases of each channel between the first link 108a and the first remote device 104a. The first remote device 104a may determine the second channel state information $V_{STA,k}$ as described in the foregoing description of FIG. 3. The first remote device 104a may be configured to transmit the determined second channel state information $V_{STA,k}$ to the first link 108a, via the third antenna 120 (as shown by arrow 514). The first link 108a may be configured to receive the second channel state information $V_{STA,k}$ from the first remote device 104a in response to the second set of data packets. The first link 108a may be further configured to determine the second spatial mapping matrix $Q_k$ based on the first channel state information $V_k$ and the second channel state information $V_{STA,k}$ (as shown by arrow 516). The determination of the second spatial mapping matrix $Q_k$ based on the first channel state information $V_k$ and the second channel state information $V_{STA,k}$ is described in the foregoing description of FIG. 3.

The first link 108a may be configured to transmit the first wireless signal steered towards the first remote device 104a on the first frequency band, based on the determined second spatial mapping matrix $Q_k$ (as shown by arrow 518). Further, the second link 108b may be calibrated to operate on the second frequency band to receive the second wireless signal from the second remote device 104b. In other words, the reception of the second wireless signal by the second link 108b and the transmission of the first wireless signal by the first link 108a occur simultaneously. In this case, the transmission of the first wireless signal by the first link 108a is null steered in the direction of the second link 108b and steered towards the first remote device 104a. As a result, a power leakage from the transmission of the first wireless signal by the first link 108a into the transmission or reception operations of the second link 108b is significantly reduced.

It will be apparent to a person skilled in the art that the operations performed by the first link 108a may be performed by the second link 108b in order to communicate with the first remote device 104a or the second remote device 104b with significantly reduced power leakage in the operations of the first link 108a.

In an embodiment, the host processor 106 may initiate the calibration process and the first link 108a may obtain the first channel state information $V_k$ based on at least one of an initiation of a communication between the first link 108a and the first remote device 104a, a change in a frequency of operation of the first link 108a, a change in a temperature of the wireless communication device 102, a change in a voltage of the wireless communication device 102, and a change in a power of the wireless communication device 102 as described in the foregoing description of FIG. 2.

In another embodiment, for obtaining the second channel state information $V_{STA,k}$, the first link 108a may be configured to communicate a channel measurement request to the first remote device 104a. In the response to the received channel measurement request, the first remote device 104a may be configured to communicate a fourth set of data packets to the first link 108a. The first link 108a may receive the fourth set of data packets from the first remote device 104a and may be configured to determine fourth channel state information based on the fourth set of data packets. The fourth set of data packets may include one or more fields that enable the first link 108a to accurately determine the fourth channel state information. The fourth channel state information may be indicative of fourth channel measurement of a fourth set of channels observed from the first link 108a to the first remote device 104a. For example, the fourth channel measurement of the fourth set of channels may indicate amplitudes and phases of each channel observed from the first link 108a to the first remote device 104a. The first link 108a may determine the second channel state information $V_{STA,k}$ based on the determined fourth channel state information in a similar manner as the first channel state information $V_k$ is determined by the first link 108a based on the third channel state information.

Figure 6:
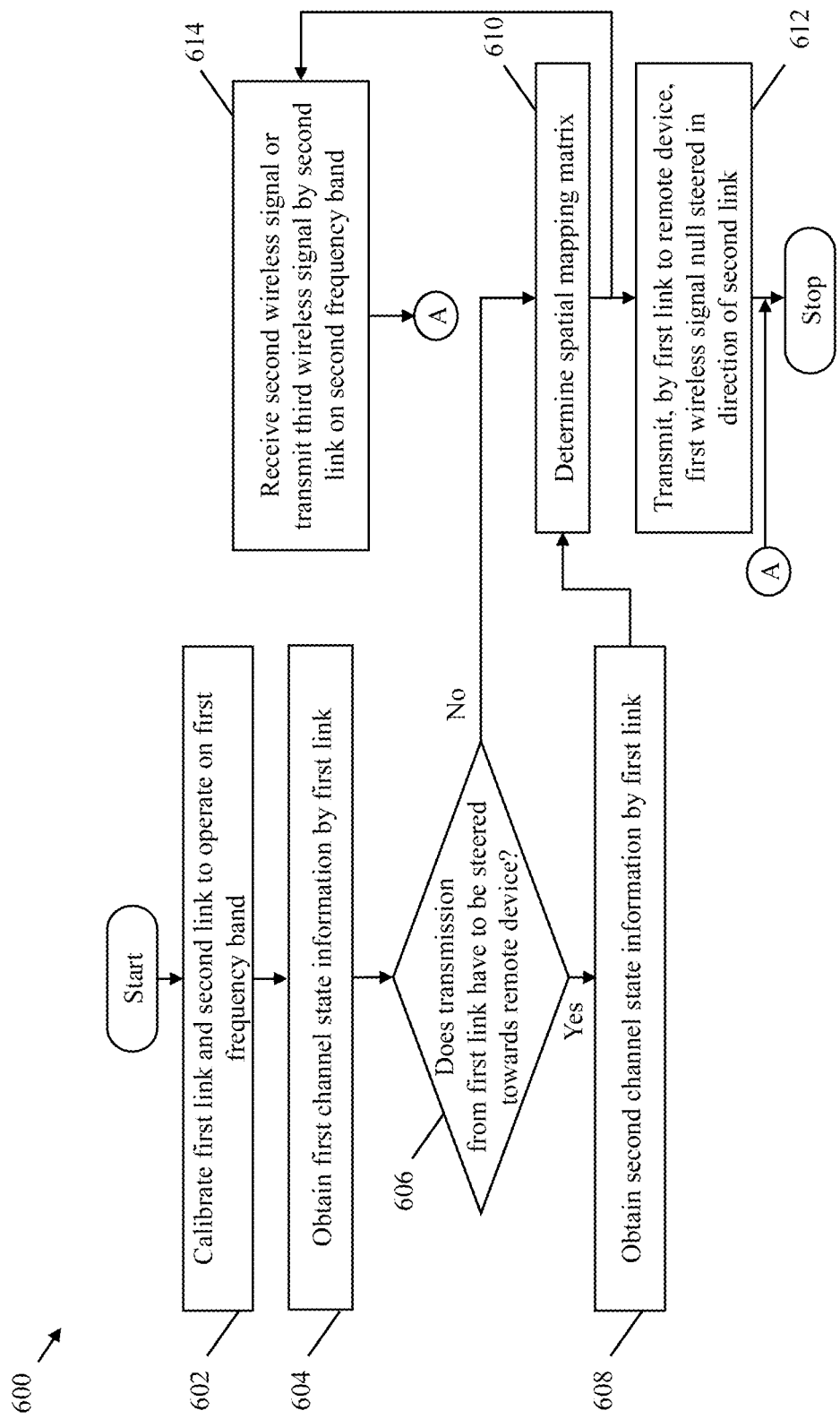
FIG. 6 represents a flow chart that illustrates a method for wireless communication in the wireless communication device of FIG. 1, in accordance with an embodiment of the present disclosure.

FIG. 6 represents a flow chart 600 that illustrates a method for wireless communication in the wireless communication device 102, in accordance with an embodiment of the present disclosure. In the wireless network 100, the wireless communication device 102 may be configured to communicate with the first and second remote devices 104a and 104b via the first and second links 108a and 108b.

At step 602, the first and second links 108a and 108b of the wireless communication device 102 are calibrated to operate on the first frequency band (e.g., 5 GHz). The first frequency band may be operational frequency of the first link 108a. The host processor 106 may be configured to calibrate the first and second links 108a and 108b to operate on the first frequency band. At step 604, the first channel state information $V_k$ is obtained by the first link 108a. The first channel state information $V_k$ indicates the first channel measurement of the first set of channels observed from the second link 108b to the first link 108a. Various operations performed by the first link 108a for obtaining the first channel state information $V_k$ are described in conjunction with FIGS. 7 and 8.

At step 606, the first link 108a is configured to determine whether the transmission of wireless signals from the first link 108a needs to be steered towards the first remote device 104a. If at step 606, the first link 108a determines that the transmission of wireless signals from the first link 108a is to be steered towards the first remote device 104a, step 608 is executed. At step 608, the second channel state information $V_{STA,k}$ is obtained by the first link 108a and step 610 is executed. The second channel state information $V_{STA,k}$ indicates the second channel measurement of the second set of channels observed from the first remote device 104a to the first link 108a. Various operations performed by the first link 108a for obtaining the second channel state information $V_{STA,k}$ are described in conjunction with FIGS. 9 and 10.

If at step 606, the first link 108a determines that the transmission of wireless signals from the first link 108a is not required to be steered towards the first remote device 104a, step 610 is executed. At step 610, a spatial mapping matrix (e.g., the first or second spatial mapping matrix $Q_k$) is determined by the first link 108a. In one embodiment where the transmission of wireless signals from the first link 108a is required to be steered towards the first remote device 104a, the second spatial mapping matrix $Q_k$ is determined based on the first channel state information $V_k$ and the second channel state information $V_{STA,k}$. In another embodiment where the transmission of wireless signals from the first link 108a is not required to be steered towards the first remote device 104a, the first spatial mapping matrix $Q_k$ is determined based on the first channel state information $V_k$. After the determination of the spatial mapping matrix, the second link 108b is calibrated by the host processor 106 to operate on the second frequency band (e.g., 6 GHz) and steps 612 and 614 may be executed in parallel (i.e., simultaneously).

At step 612, the first wireless signal is transmitted by the first link 108a to the first remote device 104a based on the determined spatial mapping matrix, such that the first wireless signal is null steered in the direction of the second link 108b. At step 614, the second wireless signal is received on the second frequency band from at least one of the first and second remote devices 104a and 104b or the third wireless signal is transmitted on the second frequency band to at least one of the first and second remote devices 104a and 104b, by the second link 108b. The third wireless signal is null steered in the direction of the first link 108a.

Figures 7, 8:
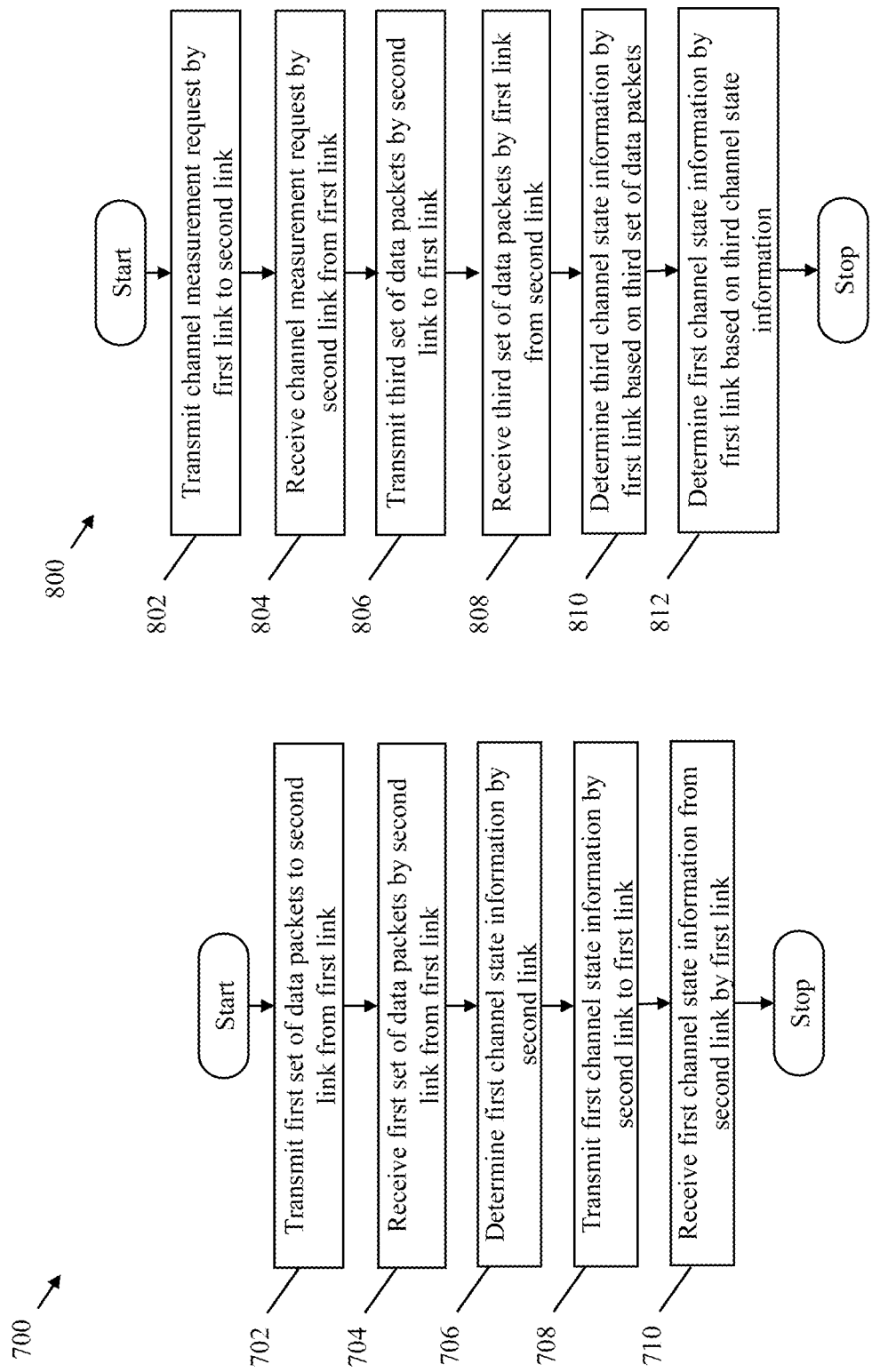
FIG. 7 represents a flowchart that illustrates a method for obtaining first channel state information by the first link of the wireless communication device of FIG. 1, in accordance with an embodiment of the present disclosure.
FIG. 8 represents a flowchart that illustrates a method for obtaining the first channel state information by the first link of the wireless communication device of FIG. 1, in accordance with another embodiment of the present disclosure.

FIG. 7 represents a flowchart 700 that illustrates a method for obtaining the first channel state information $V_k$ by the first link 108a, in accordance with an embodiment of the present disclosure. In one example, the method illustrated by flowchart 700 may correspond to an explicit sounding method. In the explicit sounding method, a wireless device can use channel state information feedback received from other wireless devices to determine a spatial mapping matrix.

At step 702, the first set of data packets is transmitted to the second link 108b by the first link 108a when the first link 108a and the second link 108b operate on the first frequency band. At step 704, the first set of data packets is received by the second link 108b from the first link 108a. At step 706, the first channel state information $V_k$ is determined by the second link 108b based on the received first set of data packets. At step 708, the first channel state information $V_k$ is transmitted by the second link 108b to the first link 108a. At step 710, the first channel state information $V_k$ is received from the second link 108b by the first link 108a.

FIG. 8 represents a flowchart 800 that illustrates a method for obtaining the first channel state information $V_k$ by the first link 108a, in accordance with another embodiment of the present disclosure. In one example, the method illustrated by flowchart 800 may correspond to implicit sounding method. In implicit sounding method, a wireless device receives data packets from other wireless devices using which the wireless device can determine a spatial mapping matrix.

At step 802, the channel measurement request is transmitted by the first link 108a to the second link 108b. At step 804, the channel measurement request is received by the second link 108b from the first link 108a. At step 806, the third set of data packets is transmitted to the first link 108a by the second link 108b in response to the channel measurement request. At step 808, the third set of data packets is received by the first link 108a from the second link 108b in response to the transmission of the channel measurement request. At step 810, the third channel state information is determined by the first link 108a based on the received third set of data packets. At step 812, the first channel state information $V_k$ is determined by the first link 108a based on the third channel state information. In an embodiment, the first link 108a may determine the first channel state information $V_k$ by transposing the matrix representing the third channel state information.

Figures 9, 10:
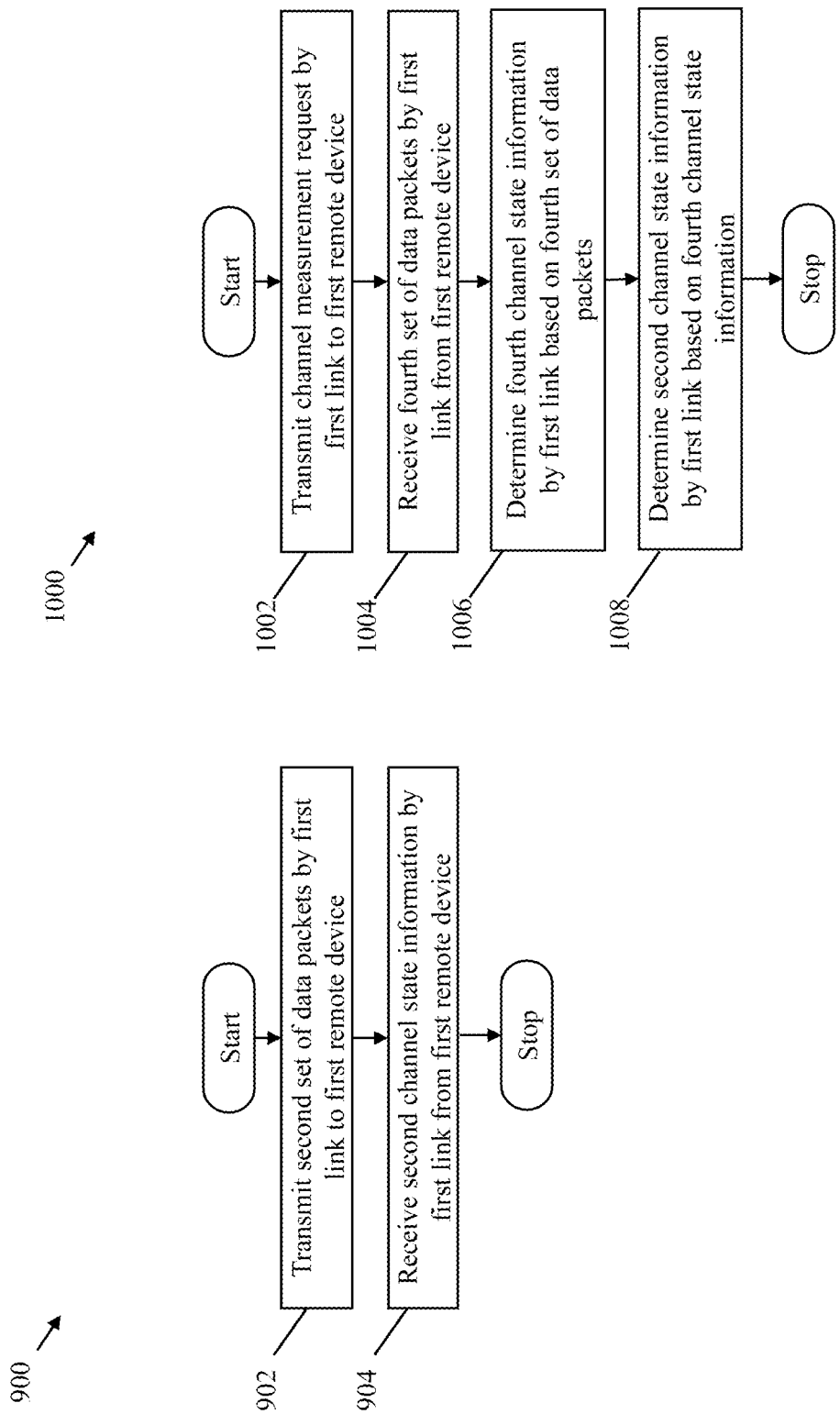
FIG. 9 represents a flowchart that illustrates a method for obtaining second channel state information by the first link of the wireless communication device of FIG. 1, in accordance with an embodiment of the present disclosure.
FIG. 10 represents a flowchart that illustrates a method for obtaining the second channel state information by the first link of the wireless communication device of FIG. 1, in accordance with another embodiment of the present disclosure.

FIG. 9 represents a flowchart 900 that illustrates a method for obtaining the second channel state information $V_{STA,k}$ by the first link 108a, in accordance with an embodiment of the present disclosure. In one example, the method illustrated by flowchart 900 may correspond to the explicit sounding method. In the explicit sounding method, a wireless device can use channel state information feedback received from other wireless devices to determine a spatial mapping matrix.

At step 902, the second set of data packets is transmitted by the first link 108a to the first remote device 104a. At step 904, the second channel state information $V_{STA,k}$ is received by the first link 108a from the first remote device 104a in response to the transmission of the second set of data packets.

FIG. 10 represents a flowchart 1000 that illustrates a method for obtaining the second channel state information $V_{STA,k}$ by the first link 108a, in accordance with another embodiment of the present disclosure. In one example, the method illustrated by flowchart 800 may correspond to implicit sounding method. In implicit sounding method, a wireless device receives data packets from other wireless devices using which the wireless device can determine a spatial mapping matrix.

At step 1002, the channel measurement request is transmitted by the first link 108a to the first remote device 104a. At step 1004, the fourth set of data packets is received by the first link 108a from the first remote device 104a in response to the transmission of the channel measurement request. At step 1006, the fourth channel state information is determined by the first link 108a based on the received fourth set of data packets. At step 1008, the second channel state information $V_{STA,k}$ is determined by the first link 108a based on the fourth channel state information. In an embodiment, the first link 108a may determine the second channel state information $V_{STA,k}$ by transposing the matrix representing the fourth channel state information.

Thus, in the wireless communication device 102 of the present disclosure, the first and second links 108a and 108b null steer the transmissions towards each other in order to significantly reduce power leakage from one link to another link. The reduction in the power leakage resolves intermodulation issues and transmission spectral mask violations, and improves packet decoding performance and channel access assessments of the first and second links 108a and 108b of the wireless communication device 102. Thus, a performance of the wireless communication device 102 of the present disclosure is significantly improved as compared to conventional wireless communication devices that do not implement null steering among multiple links. Further, the method of wireless communication using null steering among different links may be rendered backward compatible as described in the foregoing description of FIG. 1.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A wireless communication device, comprising:
first and second links comprising a first set of antennae and a second set of antennae, respectively each link operable in a transmission mode and reception mode, wherein the first and second sets of antennae have a physical arrangement such that a null space of a channel matrix between the first link and the second link is non-zero, and wherein the first link is configured to:
obtain first channel state information that indicates a first channel measurement of a first set of channels observed from the second link to the first link, when the first link and the second link are calibrated to operate on a first frequency band;
determine, based on the first channel state information, a spatial mapping matrix that facilitates null steering of a signal transmission from the first link in a direction of the second link;
transmit to a first remote device, a first wireless signal on the first frequency band based on the spatial mapping matrix, wherein the first wireless signal is null steered in the direction of the second link; and
communicate a second wireless signal on a second frequency band based on the spatial mapping matrix when the first link communicates the first wireless signal to the first remote device, the second frequency band being different from the first frequency band.

2. The wireless communication device of claim 1, wherein the arrangement of the first and second sets of antennae includes a first count of the first set of antennae being greater than a second count of the second set of antennae.

3. The wireless communication device of claim 1, wherein the arrangement of the first and second sets of antennae includes a first count of the first set of antennae being less than or equal to a second count of the second set of antennae such that a channel from an antenna of the second set of antennae to each of the first set of antennae is same and wherein each antenna of the second set is symmetrically located and spatially equidistant from each antenna of the first set.

4. The wireless communication device of claim 1, wherein the first link obtains the first channel state information based on at least one of a change in a temperature of the wireless communication device, a change in a voltage of the wireless communication device, and a change in a power of the wireless communication device.

5. The wireless communication device of claim 1, wherein to obtain the first channel state information, the first link is further configured to:
transmit a first set of data packets to the second link when the first link and the second link operate on the first frequency band; and
receive, in response to the first set of data packets, the first channel state information from the second link.

6. The wireless communication device of claim 5, wherein the second link is configured to:
receive the first set of data packets from the first link;
determine, based on the received first set of data packets, the first channel state information; and
transmit the determined first channel state information to the first link.

7. The wireless communication device of claim 1, wherein to obtain the first channel state information, the first link is further configured to:
transmit channel measurement request to the second link when the first link and the second link operate on the first frequency band;
receive, in response to the channel measurement request, a second set of data packets from the second link; and
determine second channel state information that indicates a second channel measurement of a second set of channels observed from the first link to the second link, wherein the first channel state information is obtained based on the second channel state information.

8. The wireless communication device of claim 7, wherein the second link is configured to:
receive the channel measurement request from the first link; and
transmit, in response to the channel measurement request, the second set of data packets to the first link.

9. The wireless communication device of claim 1, wherein the first link is further configured to obtain third channel state information that indicates a third channel measurement of a third set of channels observed from the first remote device to the first link, and wherein the spatial mapping matrix is further determined based on the third channel state information.

10. The wireless communication device of claim 1, wherein the second link is further configured to receive flail the second wireless signal in the second frequency band from at least one of the first remote device and a second remote device, and wherein the reception of the second wireless signal by the second link and the transmission of the first wireless signal by the first link occur simultaneously.

11. The wireless communication device of claim 1, wherein the second link is configured to transmit a third wireless signal in the second frequency band to at least one of the first remote device and a second remote device such that the third wireless signal is null steered in the direction of the first link, and wherein the transmission of the third wireless signal by the second link and the transmission of the first wireless signal by the first link occur simultaneously.

12. The wireless communication device of claim 1, wherein the spatial mapping matrix is based on a plurality of unitary matrices representing one or more intermediate channels of the first set of channels.

13. The wireless communication device of claim 1, wherein the first frequency band is 5 GHz and the second frequency band is 6 GHz.

14. A method of wireless communication in a wireless communication device, wherein the wireless communication device includes first and second links comprising first and second sets of antennae, respectively, the method comprising:
   obtaining, by the first link, first channel state information that indicates a first channel measurement of a first set of channels observed from the second link to the first link, when the first link and the second link are calibrated to operate on a first frequency band and each link operable in a transmission mode and reception mode, wherein the first and second sets of antennae have a physical arrangement such that a null space of a channel matrix between the first link and the second link is non-zero;
   determining, by the first link, based on the first channel state information, a spatial mapping matrix that facilitates null steering of a signal transmission from the first link in a direction of the second link;
   transmitting, by the first link, a first wireless signal to a first remote device in the first frequency band based on the spatial mapping matrix, wherein the first wireless signal is null steered in the direction of the second link; and
   communicating a second wireless signal on a second frequency band based on the spatial mapping matrix when the first link communicates the first wireless signal to the first remote device, the second frequency band being different from the first frequency band.

15. The method of claim 14, further comprising transmitting, by the first link, a first set of data packets to the second link when the first link and the second link operate on the first frequency band, wherein the first channel state information is obtained by the first link from the second link in response to the first set of data packets.

16. The method of claim 15, further comprising:
   receiving, by the second link, the first set of data packets from the first link;
   determining, by the second link, based on the received first set of data packets, the first channel state information; and
   transmitting, by the second link, the determined first channel state information to the first link.

17. The method of claim 14, further comprising:
   transmitting, by the first link, channel measurement request to the second link when the first link and the second link operate on the first frequency band;
   receiving, by the first link, in response to the channel measurement request, a second set of data packets from the second link; and
   determining, by the first link, second channel state information that indicates a second channel measurement of a second set of channels observed from the first link to the second link, wherein the first channel state information is obtained by the first link based on the second channel state information.

18. The method of claim 17, further comprising:
   receiving, by the second link, the channel measurement request from the first link; and
   transmitting, by the second link, in response to the channel measurement request, the second set of data packets to the first link.

19. The method of claim 14, further comprising obtaining, by the first link, third channel state information that indicates a third channel measurement of a third set of channels observed from the first remote device to the first link, wherein the spatial mapping matrix is further determined based on the third channel state information.

20. The method of claim 14, further comprising receiving, by the second link, the second wireless signal on a second frequency band from at least one of the first remote device and a second remote device, wherein the reception of the second wireless signal by the second link and the transmission of the first wireless signal by the first link occur simultaneously.

21. The method of claim 14, further comprising transmitting, by the second link, a third wireless signal on a second frequency band to at least one of the first remote device and a second remote device, wherein the third wireless signal is null steered in the direction of the first link, and wherein the transmission of the third wireless signal by the second link and the transmission of the first wireless signal by the first link occur simultaneously.

22. The method of claim 14, wherein the spatial mapping matrix is based on a plurality of unitary matrices representing one or more intermediate channels of the first set of channels.

23. The method of claim 14, wherein the first frequency band is 5 GHz and the second frequency band is 6 GHz.

* * * * *